United States Patent [19]

Miller

[11] Patent Number: 4,631,361
[45] Date of Patent: Dec. 23, 1986

[54] PROGRAMMABLE RING GENERATOR

[75] Inventor: Robert L. Miller, Westerville, Ohio

[73] Assignee: ITT Corporation, New York, N.Y.

[21] Appl. No.: 625,865

[22] Filed: Jun. 28, 1984

[51] Int. Cl.$^4$ ...................... H04M 3/02; H04M 19/02
[52] U.S. Cl. .................................. 379/351; 379/373; 379/418
[58] Field of Search .......... 179/18 HB, 51 AA, 84 R, 179/84 A, 84 T, 99 R, 18 BF, 6.3 R

[56] References Cited

U.S. PATENT DOCUMENTS

| 4,270,028 | 5/1981 | Young | 179/84 R |
| 4,282,410 | 8/1981 | Gauthier et al. | 179/84 R |
| 4,349,703 | 9/1982 | Chea, Jr. | 179/18 HB |

FOREIGN PATENT DOCUMENTS

| 0115066 | 9/1981 | Japan | 179/84 R |
| 0041068 | 3/1982 | Japan | 179/18 HB |
| 0193168 | 11/1982 | Japan | 179/18 HB |

Primary Examiner—Thomas W. Brown
Attorney, Agent, or Firm—John T. O'Halloran; Thomas F. Meagher

[57] ABSTRACT

A ring generator capable of supplying a plurality of predeterminedly selected distinct voltages each having a predetermined high amplitude and a predetermined frequency to a telephone line comprises a programmable computer having a low amplitude version of the plurality of voltages stored therein in digital form, the computer being responsive to predetermined control signals to select a desired one of the low amplitude version of the plurality of voltages stored therein, a first circuit arrangement coupled to the computer to convert the select one of the low amplitude version of the plurality of voltages to an analog version thereof and to increase the analog version to the predetermined high amplitude prior to coupling to the telephone line and a second circuit arrangement coupled to the first circuit arrangement, the telephone line and the computer to monitor the selected one of the plurality of voltage coupled from the first circuit to the telephone line to detect the operating condition of the ring generator and the telephone line.

18 Claims, 14 Drawing Figures

PROGRAMMABLE RING GENERATOR

BACKGROUND OF THE INVENTION

The present invention relates to ring generators and more particularly to a microcomputer-based distributed ring generator capable of supplying a plurality of predeterminedly selected distinct voltages each having a predetermined high amplitude and a predetermined frequency to a telephone line.

Previously separate hardware has been required for providing ringing voltages, pretrip test voltage, ANI (Automatic Number Identification) voltage, coin present test voltage, coin collect voltage and coin return voltage.

SUMMARY OF THE INVENTION

An object of the present invention is to provide a ring generator having common hardware to provide each of the functions previously provided by separate and distinct hardware as mentioned hereinabove.

Another object of the present invention is to provide a ring generator capable of delivering relatively high power levels to a telephone line with the voltage that it generates being completely programmable under digital control, allowing frequency, AC (Alternating Current) voltage and DC (Direct Current) voltage to be specified independently.

Still another object of the present invention is to provide a ring generator that supplies all of the possible ringing voltages required in various telephone systems, and also to supply the various voltages required for ring pretrip test, ANI, coin present test, coin collect and coin return.

A feature of the present invention is the provision of a ring generator capable of supplying a plurality of predetermindely selected distinct voltages each having a predetermined high amplitude and a predetermined frequency to a telephone line.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
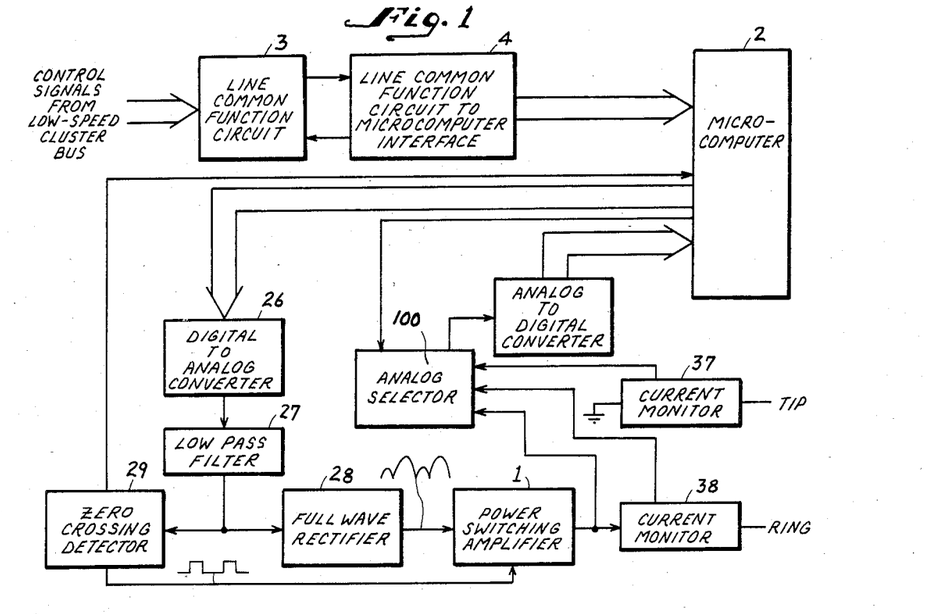
FIG. 1 is a block diagram of the programmable ring generator in accordance with the principles of the present invention.

Referring to FIG. 1, there is illustrate therein a general block diagram of the ring generator in accordance with the principles of the present invention. The programmable ring generator is based upon power switching amplifier 1, which is used to amplify low-level ring signals to the desired high-level ring voltage. A prototype ring generator has been built using a MC 6803 single-chip microcomputer 2. This is a higher performance microcomputer when compared to the 8048 family from Intel. A key requirement of the ring generator is the ability of the microcomputer 2 to multiply two 8-bit quantities relatively fast (under 20 microseconds). Any of the higher performance microcomputers (such as the Intel 8051) will perform equally well in this arrangement.

Figure 2:
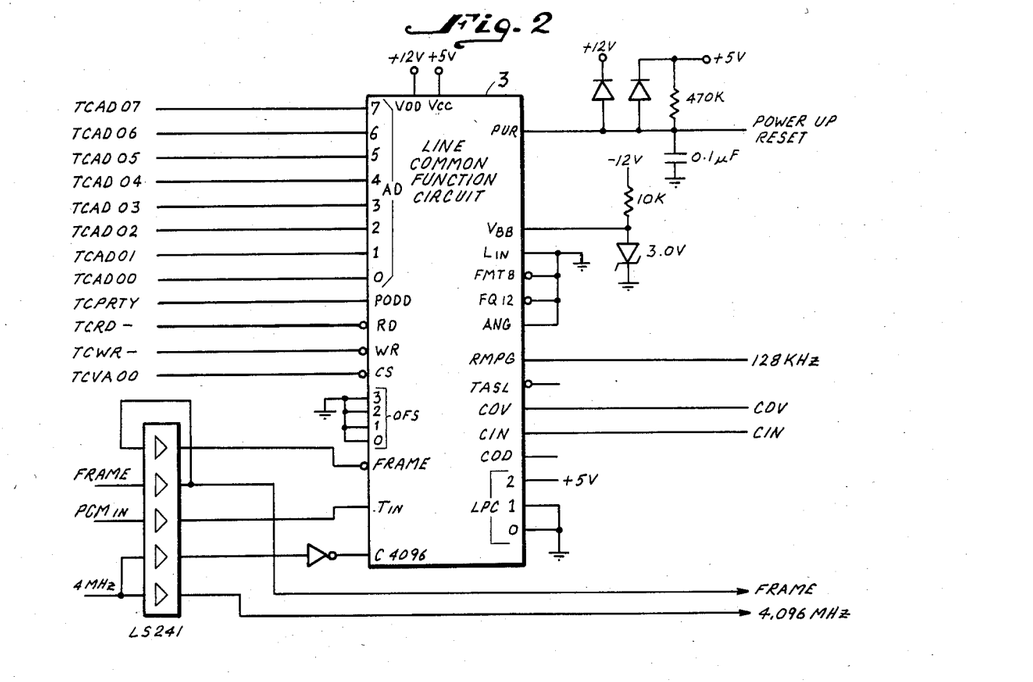
FIG. 2 is a block diagram showing the connection of the line common function circuit of FIG. 1 to the low speed cluster bus.

The ring generator integrated circuit card was constructed to interface with an ITT 1240-type architecture. This requires the ring generator to be compatible with the low-speed cluster bus used in the ITT 1240 for control purposes. This was accomplished by using the line common function integrated circuit 3. This integrated circuit 3 is used as a control interface in line cards, ring cards and other cards in the ITT 1240 line switch. A detailed description of this integrated circuit is beyond the scope of this application, but it is available in document 211 ITT 29351 AAAA-DS. To understand the function of the control interface, it is only necessary to know that circuit 3 stores 64 bytes for control purposes and 16 bytes for status. Note the detailed block diagram of the connection of circuit 3 to the low speed cluster bus in FIG. 2. The 64 drive or control bytes can be written to or from the low-speed cluster bus and these bytes are output serially at a 4.096 MB/S (megabits per second) on the line labeled COV. All 64 bytes are output in a 125 microsecond (one frame) and the process is repeated each frame. The 16 bytes for status purposes (scan bytes) are written into the circuit 3 from the CIN line. These bytes are clocked into the circuit 3 at a 1.024 MB/S rate and repeated each frame.

The microcomputer 2 is unable to read or write at these high bit rates. Therefore, some type of interfaced hardware 4 is required (note FIGS. 1 and 4). In order to read the control bytes, an 8-bit serial to parallel converter 5 is used, allowing the microcomputer 2 to read any one of the 64 bits at a time. Microcomputer 2 determines the byte to be read by writing to a 6-bit channel selector 6.

Figure 4:
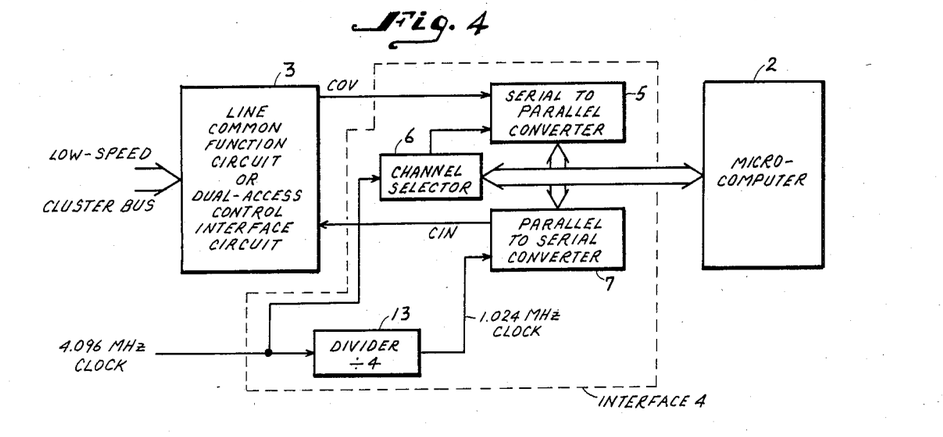
FIG. 4 is a block diagram of the line common function circuit to microcomputer interface of FIG. 1.

An 8-bit parallel to serial converter 7 is used to insert data onto the CIN line. This simple interface 4 allows microcomputer 2 to read the control bytes and return a scan byte at the rates indicated.

Figure 5:
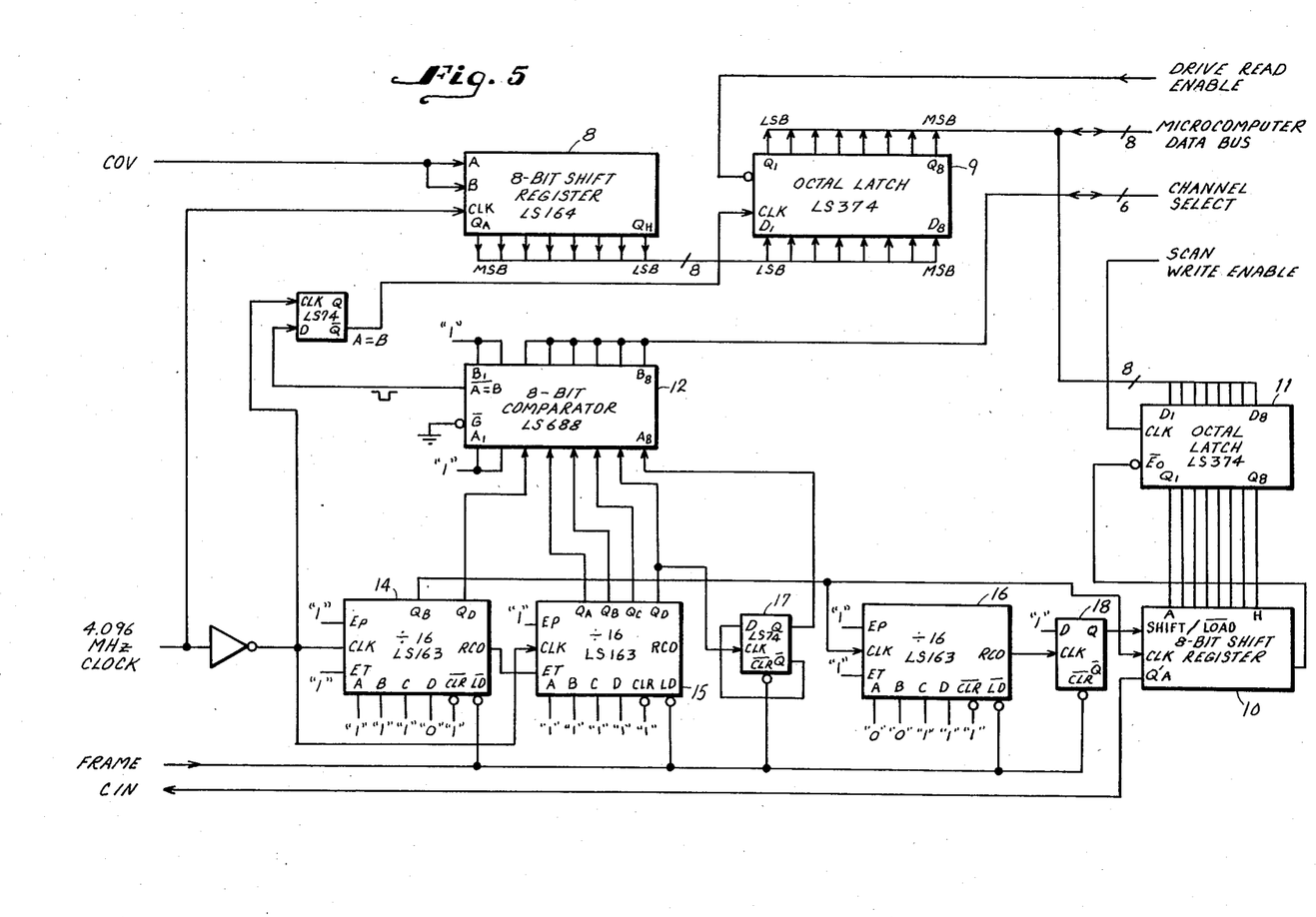
FIG. 5 is a detailed block diagram of the interface of FIG. 4.

A detailed block diagram of the interface 4 is shown in FIG. 5 where serial to parallel converter 5 includes the 8-bit shift register 8 and octal latch 9. The parallel to serial converter 7 is provided by the 8-bit shift register 10 and the octal latch 11. The channel selector 6 is provided by the 8-bit comparator 12 and the divide-by-4 divider 13 of FIG. 4 is provided by the circuit including the divide-by-16 circuits 14–16 and the D flip flops 17 and 18.

This interface circuit of FIG. 5 includes ten packages of standard large scale transistor transistor logic parts. By using parts incorporating latches within the shift registers and using an 8-bit counter instead of two 16-bit counters, package count can be reduced. In a production configuration some or all of the circuitry would be incorporated in the integrated circuit used to interface to the low speed cluster bus, namely, circuit 3.

Present information on the proposed dual-access control interface integrated circuit indicates that no microcomputer interface is to be incorporated. Since this integrated circuit is completely compatible with the line common function circuit 3 (on the line circuit side), this same large scale transistor transistor logic interface 4 will work with the dual-access control interface integrated circuit.

If a construction is chosen that incorporates two ring generators on an integrated circuit card, some of the control interface circuitry can be shared while maintaining complete independence of both ring genrators. Only three additional integrated circuits need to be added for a second ring generator. This would include an 8-bit comparator and an 8-bit shift register/latch for reading the drive byte and an 8-bit shift register/latch for writing the scan byte.

Figure 3:
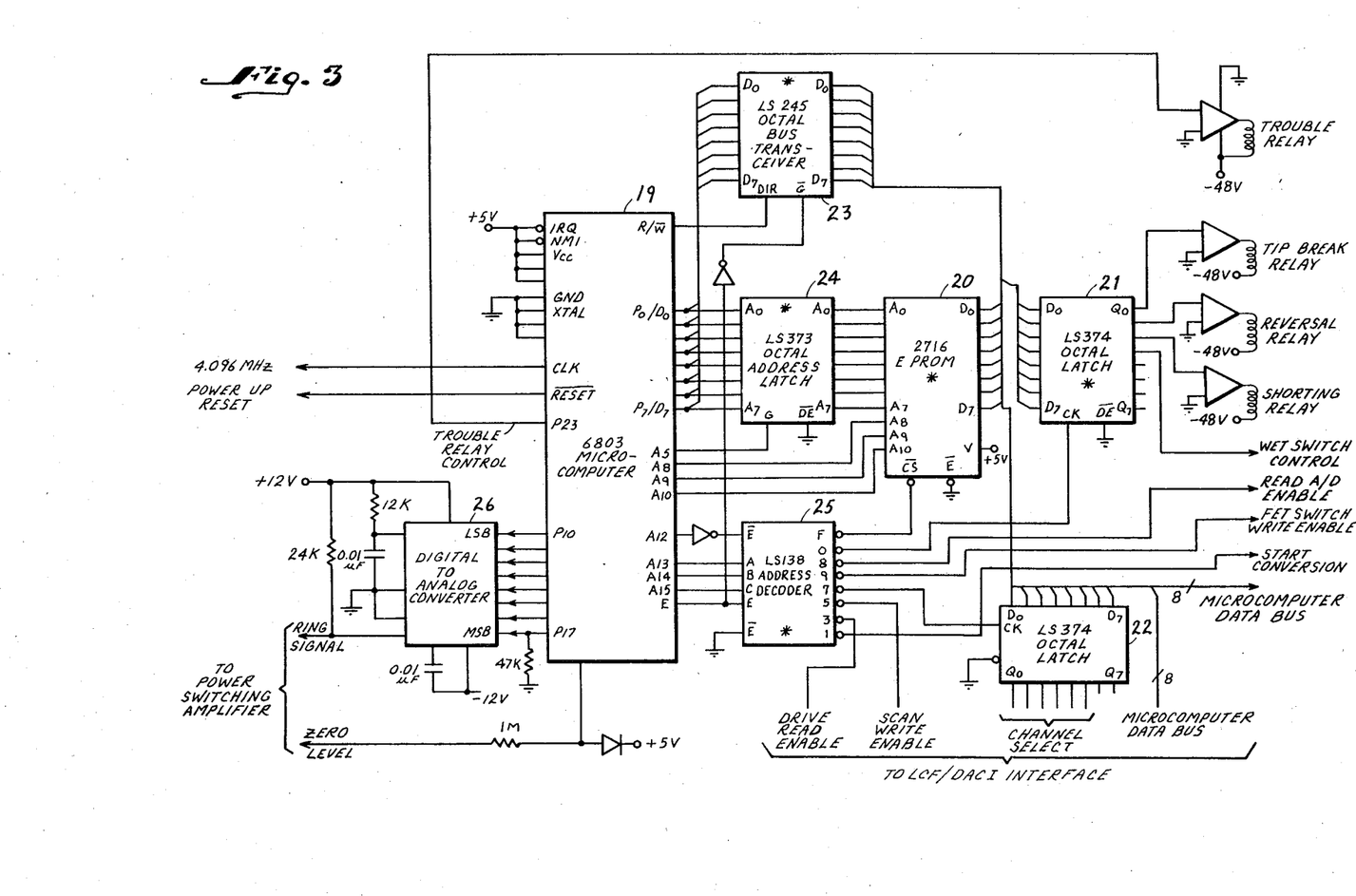
FIG. 3 is a detailed block diagram of the microcomputer control circuit for the microcomputer of FIG. 1.

Microcomputer 2 in the prototype employed a 6803 microcomputer 19 with external control circuits such as the electronically programmable ROM 20, latches 21 and 22 plus transceiver 23, address latch 24 and address decoder 25 as shown in FIG. 3. The final design of the ring generator will use a single-chip microcomputer with an on board ROM. The integrated circuits not required with a single-chip microcomputer are marked with an asterisk (*) in FIG. 3.

Microcomputer 2 has stored therein low amplitude versions of the plurality of voltages which the generator is capable of supplying, with this low level version being in digital form. An inexpensive 8-bit digital to analog converter integrated circuit 26 (FIG. 1) is used to convert the digital words elected from the digital words stored in the computer to an analog value. The value of the digital word is changed at a nominal rate of 2400 times per second (every 416 microsecond). The output of converter 26 is filtered by a low pass filter 27 to eliminate the sampling frequency (2400 HRZ). Note FIGS. 1 and 9. The resulting sinusoidal voltage is sent to a precision full-wave rectifier 28 and zero-crossing detector 29. The output from the zero-crossing detector 29 is a logic "1" when the analog value is less than zero volts, and is a logic "0" when the analog value is greater than zero volts. This logic value from detector 29 is returned to the microcomputer 2 for feedback and is also used to control power switching amplifier 1 output polarity reversal switch 30.

Figure 6:
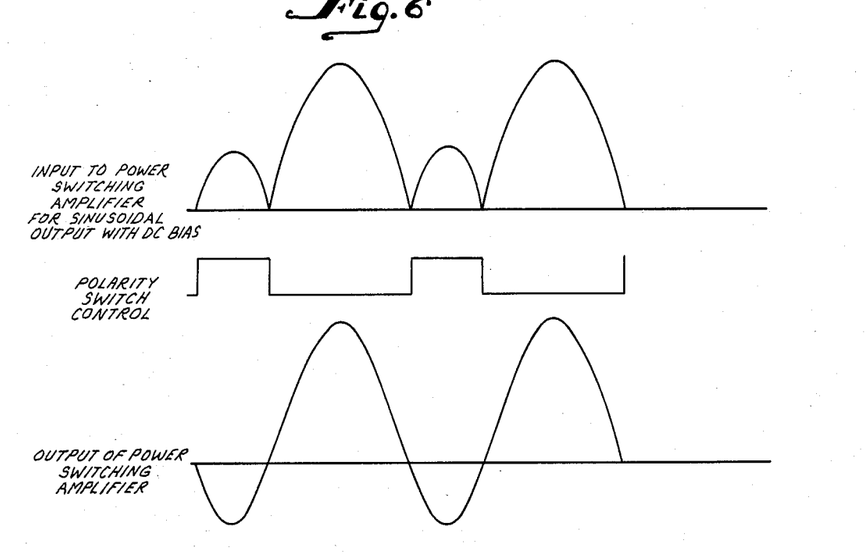
FIGS. 6 and 7 are waveforms useful in explaining the operation of the power switching amplifier of FIG. 1.

Since power switching amplifier 1 can only amplify positive voltages, negative output voltages are generated by rectifying the negative voltage and amplifying the resultant positive voltage with the output polarity switches reversed. Thus, for sinusoidal output, the amplifier input must be the absolute value of the desired waveform and the polarity switch 30 must be used to "restore" the output to the input waveform with amplification. This allows power switching amplifier 1 to produce a voltage with either a positive or negative DC bias. The waveforms associated with the power switching amplifier 1 and rectifier 28 are shown in FIG. 6.

Figure 9:
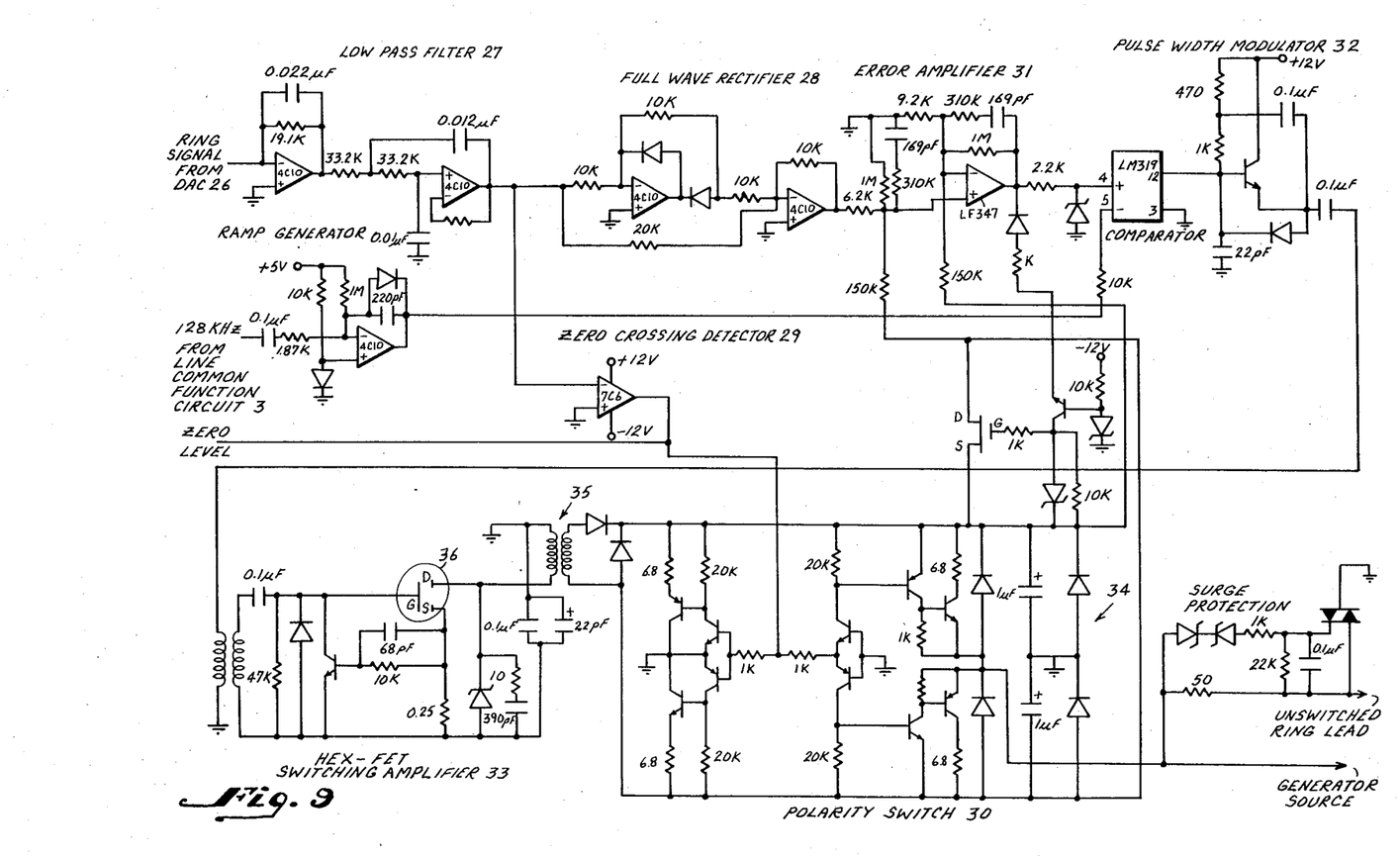
FIG. 9 is a detailed block diagram of the low pass filter, full wave rectifier and power switching amplifier together with the zero crossing detector of FIG. 1.

The power switching amplifier 1 includes the error amplifier 31, the pulse width modulator 32 and the Hex-FET switching amplifier 33 of FIG. 9.

The output of zero-crossing detector 29 can be read by the microcomputer 2. This allows the microcomputer firmware to auto-zero the output of the low pass filter 27. This eliminates the effects of the offset voltages in the operational amplifiers and the converter 26 gain variations on any zero-crossover distortion at the output. However, this arrangement-cannot correct for total gain variations in the converter 26 conversion circuitry and the switching amplifier 1. Since the total gain is dependent upon tolerances of more than ten passive components (resistors and capacitors), it is not feasible to rely on tight tolerances to minimize gain variations. There are two possible solutions. First, a simple variable gain stage (manually set by a potentiometer) could be used to calibrate the gain. This would require a one-time factory adjustment. Another approach would use the capability of the microcomputer 2 to program in a correction factor for each DC or AC voltage to be generated. However, since there is no nonvolatile storage in the microcomputer 2, this correction factor could not be programmed into the ring generator card permanently. This could be accomplished on a system basis with some type of measurement performed on the ring generator output and a correction factor sent via the circuit 3 to the microcomputer 2. This approach suffers from added system complexity, but does eliminate the need for any adjustments on the ring card.

Figure 7:
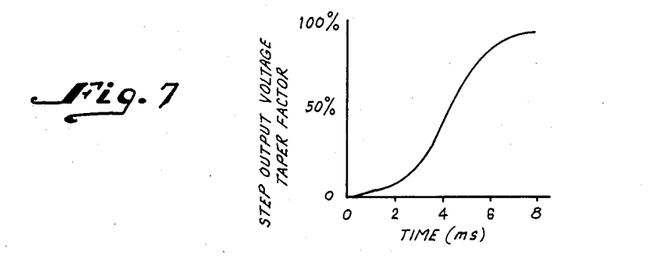

In the case of DC voltage generation for ANI or coin functions, the microcomputer 2 simply generates a constant DC value except for the turn-on and turn-off where the waveform is tapered in the manner shown at FIG. 7 to minimize impulse noise. This output is obtained by multiplying the desired DC value by a scaling factor obtained from a table contained in microcomputer 2. During turn-on, the scaling factor is obtained by reading the table from the beginning to the end. At turn-off, this is reversed; the table is read from the end back to the beginning.

For AC voltage generation, as in ringing with a superimposed DC value, the following equation is used:

$$V = ACpeak*(S) \pm DC$$

where:
  V = next value for the converter 26
  ACpeak = peak value of the AC component
  DC = DC component
  S = Sin Table Value.

The value of S is obtained from one of five Sin tables which are present in microcomputer 2. The tables are generated for the following frequencies: 16.6, 20, 25, 30 and 54 Hz. All harmonically related frequencies use the table for the base frequency, but increment through the table by two or more. For example, 40 Hz ringing uses the 20 Hz table but increments through by two. It is also possible to change the sampling rate to implement a frequency change. This is used for 42 Hz and 66 Hz. By using the same procedure as 40 Hz but increasing the sampling rate by 5%, a 42 Hz output results. Similarly, 66 Hz can be obtained from 66.6 Hz and lowering the sampling rate by 1%. This technique eliminates the need for a separate Sin table for these frequencies.

Each of the digital values for the converter 26 is calculated during the microcomputer interrupt cycle.

The interval between interrupts is determined by a value loaded into an internal timer on the microcomputer chip. Hence, the interrupt rate (which equals the sampling rate) is under firmware control. Each interrupt uses a new value for S from the Sin table. Since the interrupt rate is determined by the microcomputer clock, which in turn is a crystal-controlled source, the ring frequency generated is extremely accurate and stable. It is quite feasible to enhance the flexibility of frequency selection. For example, a special command from the circuit 3 could be used to raise or lower a particular ring frequency by 1% if desired.

Although the currently developed firmware does not allow for this, the approach taken is inherently quite flexible. Through a firmware change, this type of flexibility can be added.

There are some restrictions and trade-offs involved in the choice of the sampling frequency. In a minimum hardware configuration, the microcomputer 2 could generate digital words representing the absolute value of the waveform desired. This would eliminate the need for a precision rectifier, such as rectifier 28. However, it is difficult to filter out the sampling frequency from such a waveform.

For ring voltage generation, the absolute value of the sinusoid waveform will have cusps at the zero-crossings, (Note FIG. 6). Although the highest ring frequency is only 66.6 Hz, the low pass filter 27 must have a bandwidth of 1.5 kHz in order to reproduce the waveform. (Lower bandwidth causes excessive distortion at zero-crossings.) The sampling frequency must be significantly higher than the corner frequency in order to get adequate attenuation at the sampling frequency. This forces the sampling frequency to be relatively high. This was implemented in the prototype with the microcomputer 2 programmed with interrupts every 142 microseconds. Each interrupt updated the converter 26, resulting in a sampling frequency of 7200 Hz with excellent results.

However, using the MC6803 microcomputer with a 1-MHz clock, each interrupt takes between 110 and 130 microseconds to calculate the next digital analog converter value. This consumes a very large potion of the processing time available. This is quite satisfactory unless additional processing is required during the interrupts. This is the case if some of the monitoring filters are implemented in software. This problem can be solved by running the microcomputer 2 at a higher clock frequency (such as 2 MHz with a microcomputer MC6803B), by using an inherently faster microcomputer (such as a 16 byte type), or by changing the overall architecture to allow a lower sampling frequency (by using a hardware rectifier).

The latter approach was taken, resulting in slightly more hardware, but in the most cost effective solution. The microcomputer 2 generates digital words representing the sinusoidal signal instead of the absolute value of the sinusoid. This allows the corner of the low pass filter 26 to be much lower, since now the highest desired spectral component is the ring frequency (maximum of 66.6 Hz). A discrete precision rectifier 28 is used to restore the waveform to the desired absolute value after filtering out the sampling frequency. This extra hardware is quite minimal, adding only two operational amplifiers, two diodes and five resistors as shown in FIG. 9.

A three-pole, low-pass, filter was designed for a bandwidth of 3500 Hz, providing less than 3% attentuation at any ring frequency. If the sampling frequency was lowered to 2400 Hz (every 416 microseconds), resulting in each interrupt requiring less than 130 microseconds, about 70% of the processor time is now available for other purposes. The attenuation of the low pass filter at 2400 Hz is greater than 40 dB.

If even more time was required for other processing, the interrupt rate could be lowered to 1200 Hz, allowing only 15% of the processor time to be consumed with interrupts. However, the present low pass filter 27 as shown in FIG. 9 would provide inadequate attentuation at the lower sampling frequency, forcing additional hardware for more poles in the low pass filter 27.

Power switching amplifier 1 is composed of two principal sections. The first section, including error amplifier 31, pulse width modulator 32 and switching amplifier 33, simply amplifies the positive input voltage by a factor of 27.5. Note FIG. 9. The second section includes polarity switch 30 (switched at zero-crossings) which effectively gives both positive and negative voltage amplification as shown in FIG. 6.

Figure 8:
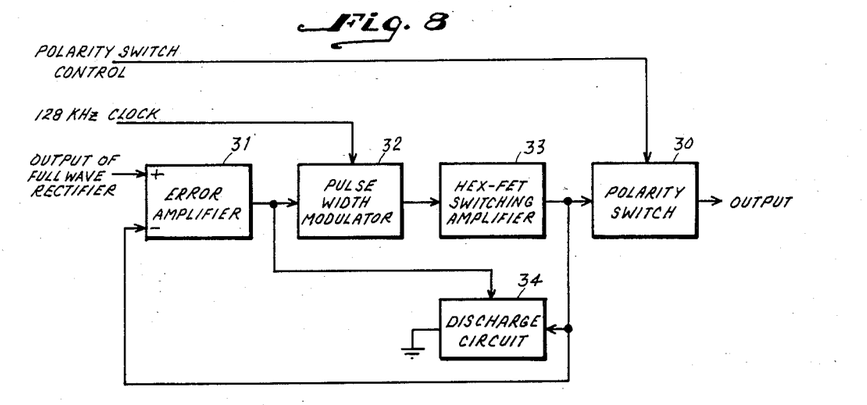
FIG. 8 is a simplified block diagram of the power switching amplifier of FIG. 1.

The amplifier 1 uses a high-speed, high-power HEX-FET device 33 switched at 128 kHz to accomplish highly efficient power generation. Note FIGS. 8 and 9. Discharge circuit 34 is required for reactive loads during part of each cycle. The polarity switch 30 uses high-voltage transistors that are only turned on or off at zero-voltage crossings.

For ringing line circuits, this construction must be capable of delivering approximately 15 Volt-Amperes at voltages of 80–150 volts alternating current with a superimposed plus or minus 48 volt direct current voltage. For the other various functions, DC voltages between 40 and 130 volts are required.

The closed loop gain of 27.5 is required to get the peak output voltage required when ringing at 140 volts alternating current. Peak voltage required is 246 volts with the peak input under this condition being 8.95 volts. Since the input voltage is processed by operational amplifiers using plus and minus 12 volt power supplies, this allows more than 3 volts of head room. The present construction is capable of delivering 15 volt amperes of power. The primary limitation of power output is the thermal temperature rise in the transformer core of transformer 35 and the HEX-FET amplifier 33. Since this temperature rise has a relatively long time constant (measured in minutes), a higher power rating is easily obtained if it is specified on an intermittent basis. For example, a worst case load on the ringer is estimated to be around 15 volt amperes while the nominal load will be much less, probably under 2 volt amperes. If a three-phase system is considered with two second phases (1.8 seconds active) and ringing three lines with loads of 15, 7 and 4 volt amps, the average load is only 7.8 volt amps. Even if all three lines are bad (10, 12 and 15 volt amperes), the average power is 11.1 volt amps, which can be easily maintained for several minutes. If this capability is not adequate, there are two possible solutions. First, the transformer 35 and possibly the HEX-FET 36 could be enlarged to handle a higher continuous power rating. Alternatively, since the output voltage and current are monitored, microcomputer firmware could be used to integrate the power over time. If the watt-minutes exceeds a specified value, the microcomputer could reduce the output voltage to limit the temperature rise. This would be a very unusual situation unless the ringing traffic was very heavy and there was a very large percentage of lines over 10 volt amps.

Figure 10:
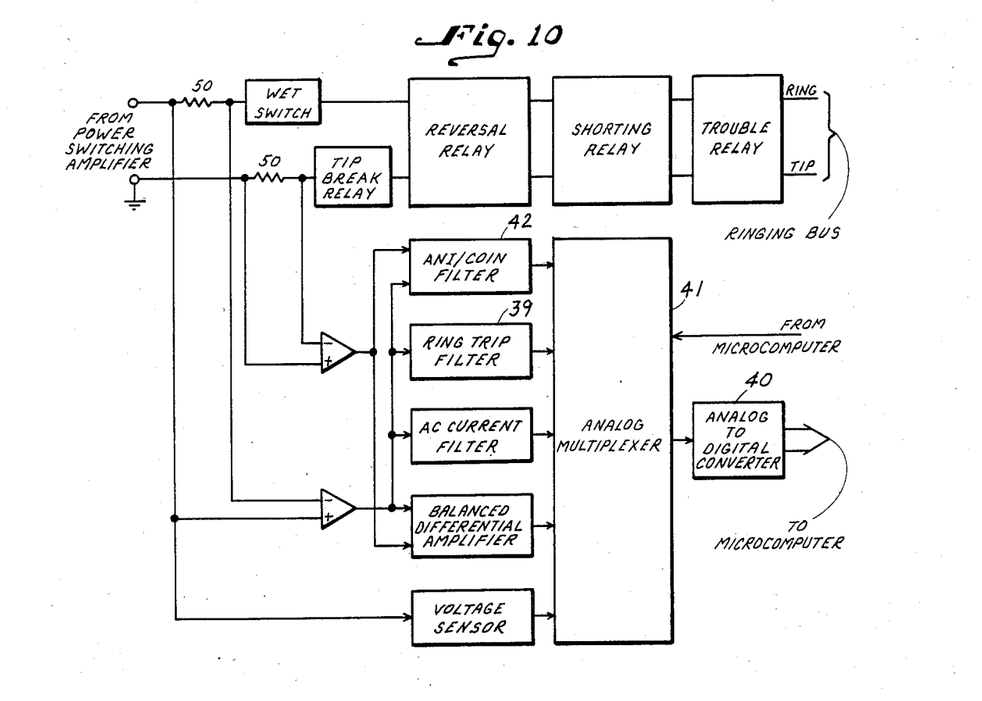
FIG. 10 is a block diagram of the monitoring circuits of FIG. 1.
Figure 11:
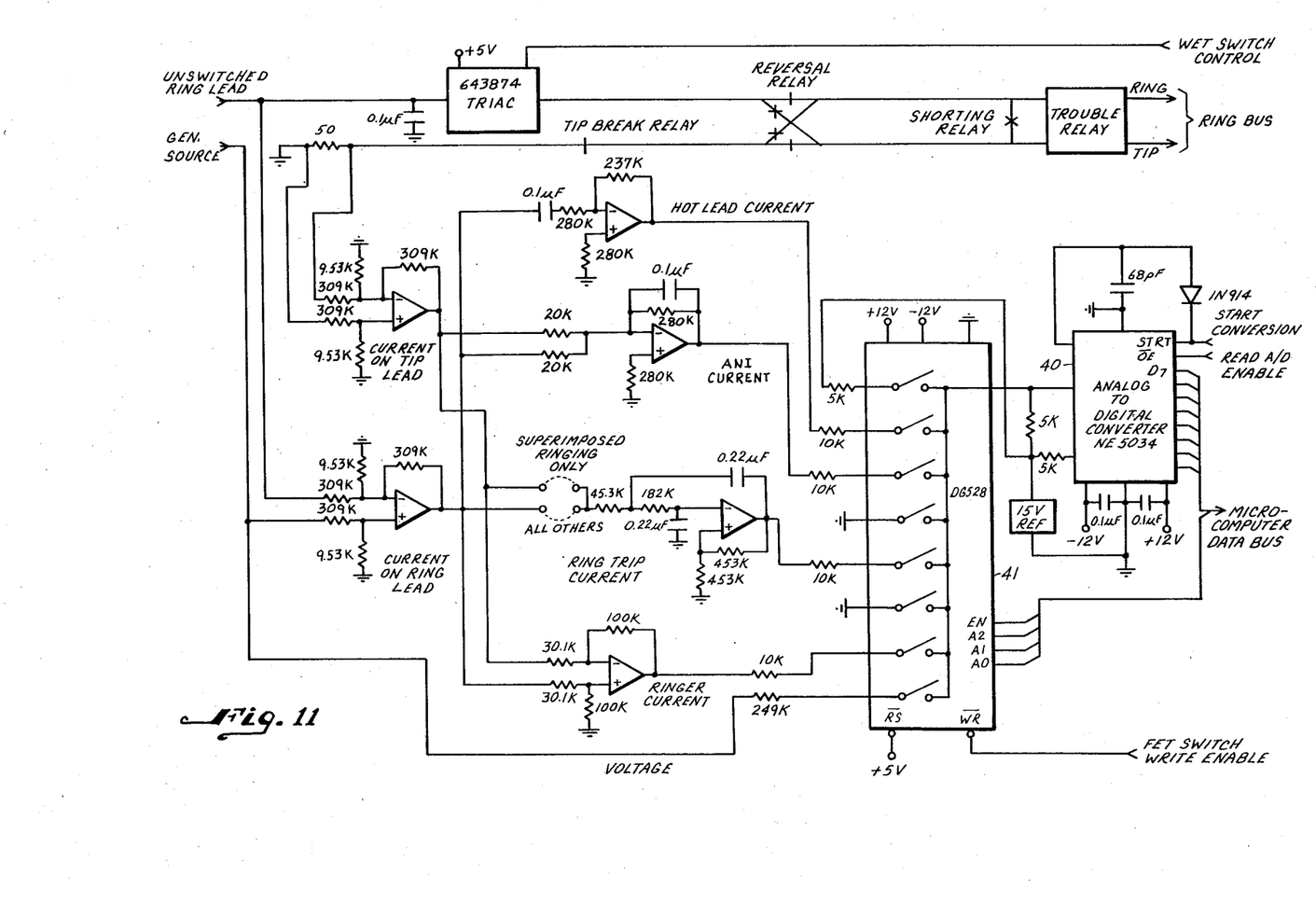
FIG. 11 is a detailed block diagram of the monitor circuit of FIG. 1.

In addition to generating the voltages necessary to drive the line circuit, the ring generator integrated circuit must also perform supervisory functions. During the application of any signal to the line circuit, microcomputer 2 must update the scan byte with current line circuit status. This is accomplished by monitoring the current in the line circuit with monitors 37 and 38 as shown in FIG. 1. FIG. 10 shows a block diagram and FIG. 11 shown a more detailed block diagram of the monitor circuits of FIG. 1.

The monitor circuits are also used to detect fault conditions in the line circuit and to verify power output voltage generation. In order to configure the generator to drive all combinations of functions, several relays are required. These relays are shown in FIG. 3 under control of the microcomputer and in FIG. 10. The contacts for various ones of these relays are shown in FIG. 11. These relays allow tip and ring lead shorts or reversals. The WET switch and the signal controlling the same prevents power on the line, and generator, such as from lightning strikes or power lines, which could shock personnel operating in or around the equipment Separate hardware was previously used to measure the AC and DC currents for ANI, ring functions and coin functions. Each of the ring functions (ring pretrip, ring trip, ring current present and ring voltage present) requires separate hardware to filter the desired parameter. For example, for ring trip monitoring, only the DC component of ring current was used to determine the on or off hook status. This required removing the AC component with a multi-pole, low pass filter 39 with sufficient attentuation to eliminate the lowest ring frequency (16 Hz). It also had to eliminate any 60 Hz or higher harmonics of power line induction present. Then, a hardware detection circuit was used to determine when the DC current exceeded the ring trip threshold. Each function typically had a separate filter and detector. The newer version disclosed herein minimizes the hardware required by combining as many functions as possible with common hardware. The principal element of the monitoring circuit that allows for this saving in hardware is the 8-bit analog to digital converter 40 (FIG. 10). Converter 40 serves as the threshold detector for all functions. The converter 40 will not respond until a certain analog value has been reached. The analog selector 100 (FIG. 1) may comprise, for example, analog 8-to-1 multiplexer 41 which allows any of the different filter outputs to be selected for measurement. The 8-bit analog to digital converter 40 provides much more than a simple threshold detector which is simply a 1-bit analog to digital converter. With 8 bits of digital representation, some of the filtering required to separate the AC and DC components can be performed in software. This reduces the number of poles required in the analog filters resulting in less hardware. The analog filters cannot be completely eliminated due to the limitation of dynamic range in an 8-bit analog to digital converter 40.

Figure 12:
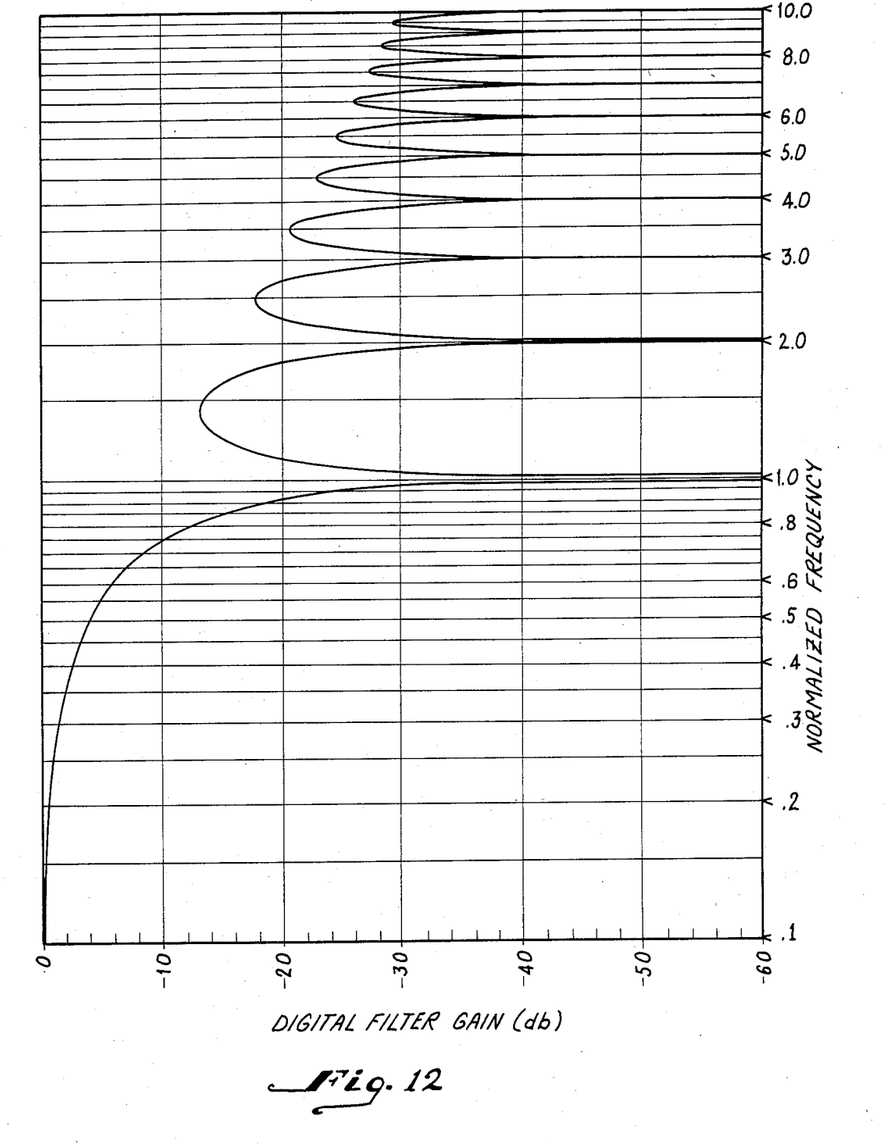
FIGS. 12, 13 and 14 are waveforms useful in explaining the operation of the monitor circuit of FIG. 11.

For some measurements, only the AC component is desired, such as ring current. For most other measurements, only the DC component is desired. These components can be determined by using simple software algorithms. If a series of sample values is averaged, the DC component is not attenuated. The AC component attentuation is a function of frequency as shown in FIG. 12. The horizontal scale of FIG. 12 is a function of the time interval over which the samples have been averaged. For example, if samples are averaged for 50 milliseconds, the reciprocal is 20 Hz and corresponds to 1 on the scale. The attenuation of 20 Hz would be infinite, as would the attentuation of 40 Hz, 60 Hz, etc. By selecting the period of samples to be the reciprocal of the ring frequency, a very effective filter for measuring the DC loop current during ringing can be implemented.

For some ring frequencies, the software filter completely eliminates the 60 Hz power line induction. This includes 20, 30 and 40 Hz. (For 40 Hz ringing, a 60 Hz filter is used.) Even for the other ring frequencies, at least 15 dB of attentuation occurs at 60 Hz. This, combined with the analog prefilter, provides more than 50 dB attenuation at 60 Hz.

The DC current is derived using the following equation:

$$I_{DC}=(S_1+S_2+S_3+S_N)/N,$$

where $S_N$ is each sampled value and N is chosen to eliminate the AC component.

For the measurement of AC quantities, such as ringer current, a more complex algorithm is required. Since the ring frequencies are as high as 66.6 Hz, it is not feasible to use filters to eliminate 60 Hz power induction. In this case, the ring current is measured differentially to eliminate the common mode 60 Hz induction currents. The AC and DC ring currents are then determined in software using the following equations:

$$I^2_{rms}=(S_1^2+S_2^2+S_N^2)/N$$

and $$I^2_{AC}=I^2_{rms}-I^2_{DC}$$

In addition to the software filter eliminating hardware, it also improves performance. For example, previous designs typically used three poles of analog filters to eliminate the AC ring frequency during ring trip measurements. The filter used a corner at 3 Hz in order to get adequate attenuation at all ring frequencies (as low as 16.6 Hz). This low filter bandwidth causes significant delay through the filter. For a step function on the input (similar to an off-hook change), the filter had a delay on the order of 190 milliseconds to get to 95% of final value.

Figure 13:
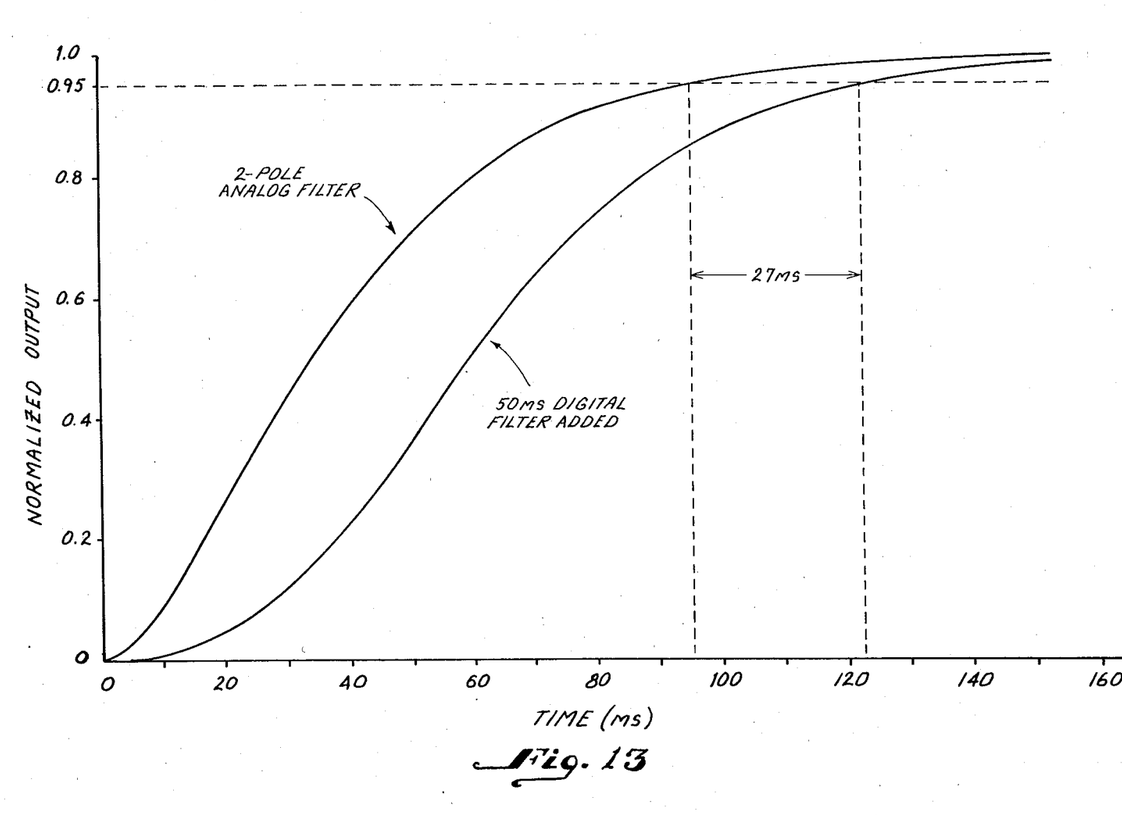
Figure 14:
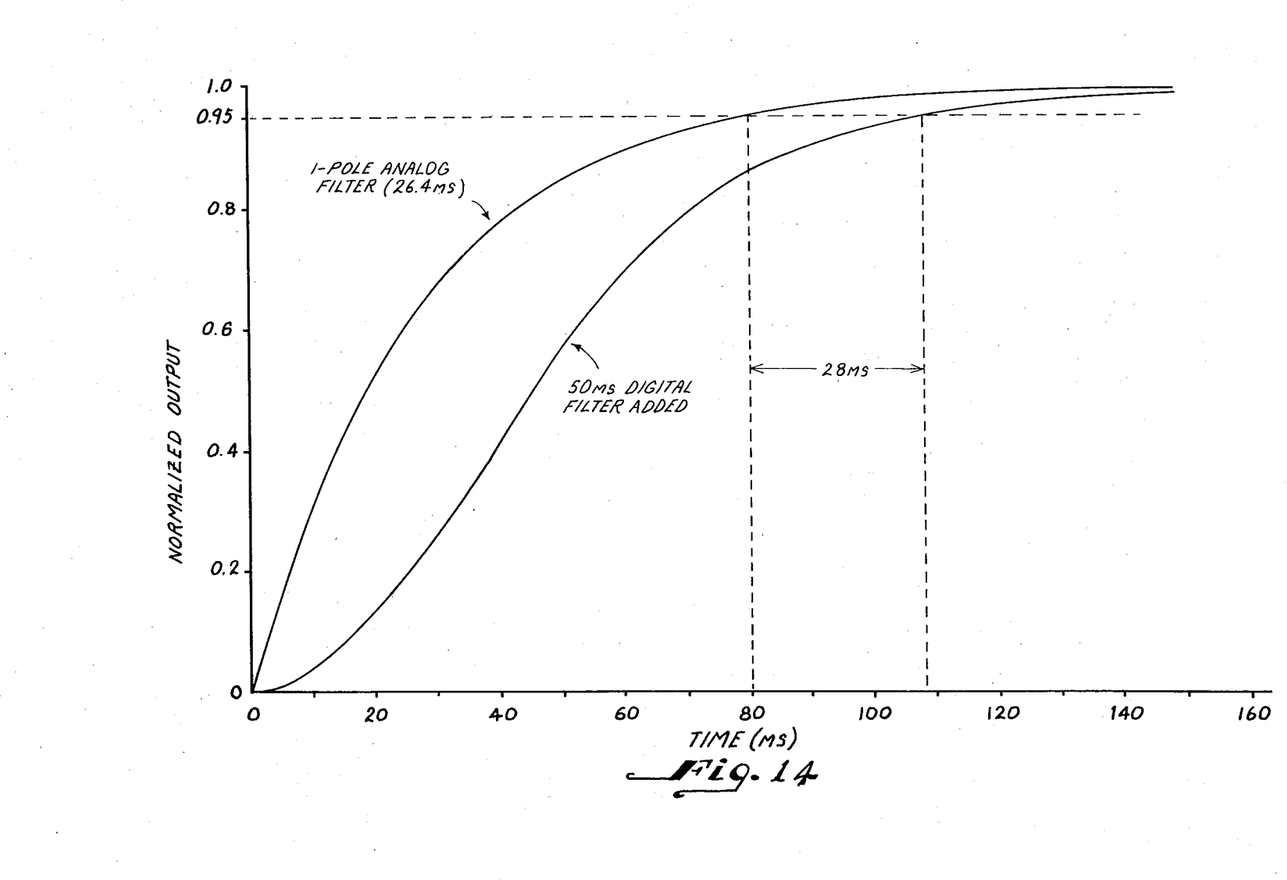

The new design only requires two poles at 6 Hz in the ring trip analog filter, allowing the step response settling time to be less than 125 milliseconds. Note FIG. 13. Similarly, the ANI/coin filter 42 has a step response settling time of less than 110 milliseconds. Note FIG. 14. The response times are nominally one half as long if 80% of final value is enough resolution.

The firmware for the MC6803 microcomputer is composed essentially of two separate entities. These entities can be thought of as a foreground and a background. The background code is executed during the interrupt cycle, which is occurring at a nominal 2400 Hz rate. The foreground code is being executed at all other times. In many ways this gives the appearance of two separate computers operating simultaneously. Even from a programming point of view, each section is written as though it was independent of the other. Only two principal requirements must be met with this type of system. First, the interrupt cycle (background code) must always return control to the foreground code before the next interrupt occurs. For this system, each interrupt cycle must be completed in less than 400 microseconds. A second requirement that must be met concerns the foreground code. Since the foreground code is constantly being interrupted, it is imperative that the code be tolerant to dead times. This means that the foreground code cannot use any software loops for critical timing and cannot be expected to respond rapidly to external events.

Since the interrupts are generated by a hardware timer on the microcomputer chip, the background code can be executed at a precisely controlled rate. This makes the background code the ideal place for the code required to generate each new digital to analog converter digital value. It is also where the software filter code is executed (although it is executed only on alternate interrupts). Both sections of the code are relatively short and can be executed in the 400 microsecond window.

The foreground code contains all of the remaining codes such as initialization, interfacing to the line common functions circuit, interpreting the line common functions protocol, passing informatin to the background and time out functions.

The choice of protocol for the control of the microcomputer 2 is somewhat arbitrary. The protocol described hereinbelow describes that used in the prototype and represents a good compromise between speed, number of bytes required and flexibility. If a change is required for a new function, the firmware can easily be changed to incorporate additional needs.

Since the ring generator has no direct control over the line card ring relays, it is assumed that the microcomputer 2 will not have direct control of cadence. The microcomputer 2 will be notified when to turn the ringing on and off through commands via the line common function circuit 3. This does not preclude some firmware timing functions. For example, the coin and ANI DC output levels are terminated after 500 microseconds, even in the absence of a termination command.

The protocol was chosen based on resources available. The line common functions circuit or dual access control interface circuit has 64 bytes of memory for control information. For use with the ring generator, this memory is divided into 16 groups of 3 bytes each. In addition, two other bytes are reserved as control bytes for generator 0 (byte 0) and generator 1 (byte 8). Each of the 16 groups or pages, contains the required information to implement a specific function and can be used by either generator. TABLE I shows how these 50 bytes are allocated in the 64 available bytes

TABLE I

| Byte No. | |
|---|---|
| 0 | Control Byte 0 |
| 1 | |
| 2 | Page 0 |
| 3 | |
| 4 | |
| 5 | Page 1 |
| 6 | |
| 7 | |
| 8 | Control Byte 1 |
| 9 | |
| 10 | Page 2 |
| 11 | |
| 12 | |
| 13 | Page 3 |
| 14 | |
| 15 | |
| 16 | |

TABLE I-continued

| Byte No. | |
|---|---|
| 17 | |
| 18 | |
| 19 | |
| . | |
| . | |
| . | |
| 58 | |
| 59 | Page 14 |
| 60 | |
| 61 | |
| 62 | Page 15 |
| 63 | |

Each generator has a control byte that is of fixed assignment to that generator. The control byte effectively functions as a pointer to any one of the 16 3-byte pages. The control byte format is shown below:

| bit | 7 | 6 | 5 | 4 | 3 | 2 | 1 | 0 |
|---|---|---|---|---|---|---|---|---|
| | $A/\overline{B}$ | $P_3$ | $P_2$ | $P_1$ | $P_0$ | $FC_2$ | $FC_1$ | $FC_0$ |

$FC_N$: Function Code.
$P_N$: Page Number.
$A/\overline{B}$: Controlling Processor (dual access).

The combination of the function code and the contents of the page define the exact function to be performed by the generator.

Four bits determine the one of the 16 different-pages to use for configuration data. The $A/\overline{B}$ bit can be used to determine which system processor in the dual access control interface environment has issued the command.

The following function codes have been assigned:

| | | Code | | |
|---|---|---|---|---|
| Function | Bits: | 2 | 1 | 0 |
| Idle | | 0 | 0 | 0 |
| Ring Pretrip | | 0 | 0 | 1 |
| Ring | | 0 | 1 | 0 |
| ANI | | 0 | 1 | 1 |
| Coin | | 1 | 0 | 0 |
| Coin Present | | 1 | 0 | 1 |
| Unused | | 1 | 1 | 0 |
| Special | | 1 | 1 | 1 |

The microcomputer 2 scans its control byte. If the function code is 000, the microcomputer 2 does nothing. When the function code changes to an active state, the microcomputer 2 sets up the conditions to perform the function indicated. The page number indicates which configuration data the microcomputer 2 uses during the setup. That function is performed until the function code returns to idle. At that time the microcomputer 2 phases that function down.

Each page uses the following format:

| Bit | 7 | 6 | 5 | 4 | 3 | 2 | 1 | 0 |
|---|---|---|---|---|---|---|---|---|
| Byte 2 | | | | | | | $TR_R$ | TB |
| Byte 3 | | $C/\overline{T}$ | $L/\overline{D}$ | $T/\overline{R}$ | $AC_3$ | $AC_2$ | $AC_1$ | $AC_0$ |
| Byte 4 | DCP | $DC_2$ | $DC_1$ | $DC_0$ | $F_3$ | $F_2$ | $F_1$ | $F_0$ |

The byte numbers shown (2, 3, and 4) are for page 0. Other pages use the same format sequence with higher byte numbers.

Bits 0 through 3 and byte 4 ($F_0$ through $F_3$) determine the ring frequency. The frequencies are assigned as follows:

TABLE II

| Frequency | Bits: | Code 3 | 2 | 1 | 0 |
|---|---|---|---|---|---|
| 0 | | 0 | 0 | 0 | 0 |
| 16⅔ | | 0 | 0 | 0 | 1 |
| 20 | | 0 | 0 | 1 | 0 |
| 25 | | 0 | 0 | 1 | 1 |
| 30 | | 0 | 1 | 0 | 0 |
| 33⅓ | | 0 | 1 | 0 | 1 |
| 40 | | 0 | 1 | 1 | 0 |
| 42 | | 0 | 1 | 1 | 1 |
| 50 | | 1 | 0 | 0 | 0 |
| 54 | | 1 | 0 | 0 | 1 |
| 60 | | 1 | 0 | 1 | 0 |
| 66 | | 1 | 0 | 1 | 1 |
| 66⅔ | | 1 | 1 | 0 | 0 |
| Unassigned | | 1 | 1 | 0 | 1 |
| Unassigned | | 1 | 1 | 1 | 0 |
| Unassigned | | 1 | 1 | 1 | 1 |

Bits 4 through 6 of byte 4 ($D_0$, $D_1$, $D_2$) define the DC voltage to be generated. The DC voltages are used in all modes except idle. The codes are as follows:

TABLE III

| DC Voltage | Bits | Code 6 | 5 | 4 |
|---|---|---|---|---|
| 0 | | 0 | 0 | 0 |
| 38 | | 0 | 0 | 1 |
| 48 | | 0 | 1 | 0 |
| 100 | | 0 | 1 | 1 |
| 110 | | 1 | 0 | 0 |
| 130 | | 1 | 0 | 1 |
| Unassigned | | 1 | 1 | 0 |
| Unassigned | | 1 | 1 | 1 |

Bit 7 of byte 4 (DCP) determines the DC polarity with a 1 signifying a negative DC voltage.

The AC voltage value is determined by bits 0 through 3 in byte 3 ($AC_0$ through $AC_3$). The voltages are assigned the following codes.

TABLE IV

| AC Voltage | Bits: | Code 3 | 2 | 1 | 0 |
|---|---|---|---|---|---|
| 0 | | 0 | 0 | 0 | 0 |
| 86 | | 0 | 0 | 0 | 1 |
| 90 | | 0 | 0 | 1 | 0 |
| 95 | | 0 | 0 | 1 | 1 |
| 100 | | 0 | 1 | 0 | 0 |
| 105 | | 0 | 1 | 0 | 1 |
| 110 | | 0 | 1 | 1 | 0 |
| 115 | | 0 | 1 | 1 | 1 |
| 120 | | 1 | 0 | 0 | 0 |
| 125 | | 1 | 0 | 0 | 1 |
| 130 | | 1 | 0 | 1 | 0 |
| 135 | | 1 | 0 | 1 | 1 |
| 140 | | 1 | 1 | 0 | 0 |
| Unassigned | | 1 | 1 | 0 | 1 |
| Unassigned | | 1 | 1 | 1 | 0 |
| Unassigned | | 1 | 1 | 1 | 1 |

Bit 4 of byte 3 (T/$\overline{R}$) designates the generator lead (Tip or Ring) to which the ring voltage is applied. Bit=0 indicates Ring lead. Bit=1 indicates Tip lead.

Bit 5 of byte 3 (L/$\overline{D}$) designates which type of ANI test is to be performed when the function code is 011 (ANI). The DC voltage and its polarity are specified in byte 4. When the bit is a 1, a longitudinal type test is performed. When the bit is a 0 there is a differential type test performed.

Bit 6 of byte 3 (C/$\overline{T}$) defines which type of coin test should be performed. When the bit is a 0, standard REA test is to be performed. When the bit is a 1, an LSSGR test is to be performed.

Bit 0 of byte 2 (TB) is used for control of the test bus relay. When the bit is 0, the relay is not operated. When the bit is a 1, the relay is operated. An operated relay disconnects the test bus from the line cards in that cluster.

Bit 1 of byte 2 ($TR_R$) is used for control of the trouble relay. When the bit is a 0, the trouble relay is not operated. When the bit is a 1, the relay is operated. The trouble relay disconnects an associated generator and connects itself to the load of that generator.

Since this assignment of bit functions is arbitrary and some bit positions are not assigned, additional control function and/or changes can be implemented within this general framework.

Status information from the microcomputer 2 is written into the line common function control circuit 3 via a serial 1 MB/S bus (16 bytes per frame). However, to minimize hardware, only a single byte of status information is returned to the circuit 3. Based on only a single byte for each generator, the following format has been chosen:

| Bits | 7 | 6 | 5 | 4 | 3 | 2 | 1 | 0 |
|---|---|---|---|---|---|---|---|---|
| | $S_5$ | $S_4$ | $S_3$ | $S_2$ | $S_1$ | $S_0$ | $FC_1$ | $FC_0$ |

$FC_N$: Function Code.
$S_N$: Scan Bits.

The function code identifies the four states of the scan byte as follows:

TABLE V

| Function | Bits: | Code 1 | 0 |
|---|---|---|---|
| Fault | | 0 | 0 |
| Idle | | 1 | 1 |
| Status | | 1 | 0 |
| Command Acknowledged | | 1 | 1 |

The fault condition was chosen to be 00. This code is easily obtained by resetting the latch containing the scan byte. This allows hardware external to the microcomputer 2 to override the micro-computer to report fault conditions. The fault condition can also be reported by the microcomputer 2 (up to 63 different faults with the all-zero fault reserved for external hardware). The idle state is code 01 and the $S_N$ bits normally all 0's.

The status state (10) identifies the generator as active. A new command may not be given until the generator is forced idle. The $S_N$ bits identify what event or condition recently occurred. The $S_N$ bits are basically associated with the function code (10). A few basic facts concerning the $S_N$ bits should be explained.

Zero State—This state indiates that the event has not occurred.

Bit Assignments—Each $S_N$ bit has a different meaning depending on the function code of the control byte.

See Table VI:

TABLE VI

| Control Function Code | | SN Bit Assignment | | | | | | | |
|---|---|---|---|---|---|---|---|---|---|
| | | Scan Byte Format | | | | | | | |
| State | Code | Bits 7 | 6 | 5 | 4 | 3 | 2 | 1 | 0 |
| Hardware Fault | XXX | | | | | | | 0 | 0 |
| Idle | 000 | | | | | | | 0 | 1 |
| Busy (no results) | 001 | 0 | 0 | 0 | 0 | 0 | 0 | 1 | 0 |
| Ring Pretrip | 001 | | | DCV | F | RPT | ONH | 1 | 0 |
| Ring | 010 | AVC | ACI | DCV | DCI | | RT | 1 | 0 |
| ANI | 011 | | | DCV | DCI | P2 | P1 | 1 | 1 |
| Coin | 100 | | | DCV | DCI | | | 1 | 0 |
| Coin Present | 101 | | | DCV | DCI | $\overline{CP}$ | CP | 1 | 0 |
| Unassigned | 110 | | | | | | | 1 | 0 |
| Special | 111 | | | | | | | 1 | 0 |
| Command Acknowledged | | | | | | $FC_N$ | $FC_N$ | $FC_N$ | 1 | 1 |

Missing bits in this Table mean a Don't Care condition.

By employing the system of the present invention, it is now possible to use a distributed programmable ring generator in a line switch instead of a bulk type ring generator. This allows for a more cost-effective switch, particularly in small central offices. By using a microcomputer to control the ring generator, more flexibility is possible. It allows common hardware to satisfy all possible ringing configurations, including the type of ringing (divided, bridged or superimposed) and other parameters involved (AC voltage, DC voltage and frequency). The microcomputer can also simplify the supervisory functions such as ring trip, ring pretrip and ring current monitoring. In addition, the ring generator of the present invention can handle tasks, such as ANI and coin functions, that previously required separate hardware.

While I have described above the principles of my invention in connection with specific apparatus, it is to be clearly understood that this description is made only by way of example and not as a limitation to the scope of my invention as set forth in the objects thereof and in the accompanying claims.

I claim:

1. A ring generator capable of supplying a plurality of predeterminedly selected distinct voltages each having a predetermined high amplitude and a predetermined frequency to a telephone line comprising:

a programmable computer means having low amplitude versions of said plurality of voltages stored therein in digital form, said computer means being responsive to predetermined control signals to select a desired one of said low amplitude versions of said plurality of voltages stored therein;

first means coupled to said computer means to convert said selected one of said low amplitude versions of said plurality of voltages to an analog version thereof and to increase said analog version to the predetermined high amplitude corresponding thereto prior to coupling to said telephone line;

second means coupled to said first means, said telephone line and said computer means to monitor said selected one of said plurality of voltages coupled from said first means to said telephone line to detect the operating condition of said ring generator and said telephone line; and an interface means to couple said control signals from control equipment to said computer means and to couple status signals from said computer means to said control equipment, wherein said interface means includes a serial to parallel converter to couple said control signals from said control equipment to said computer means, and a parallel to serial converter to couple said status signals from said computer means to said control equipment.

2. A generator according to claim 1, wherein said computer means includes a microcomputer.

3. A generator according to claim 2, wherein certain of said plurality of voltages are direct current voltages each having a level corresponding to a predetermined high amplitude and a zero predetermined frequency, and others of said plurality of voltages are alternating current voltages each having a predetermined high amplitude and a predetermined frequency greater than zero.

4. A generator according to claim 3, wherein said first means includes a digital to analog converter coupled to said microcomputer to convert said selected one of said low amplitude versions of said plurality of voltages to said analog version, a low pass filter coupled to said digital to analog converter to eliminate sampling frequencies from said analog version, a full wave rectifier coupled to said low pass filter to rectify negative portions of said analog version, a zero crossing detector having an input coupled to said low pass filter and an output coupled to said microcomputer, said zero crossing detector providing a logic one when the amplitude of said analog version is greater than zero volts, and a power switching amplifier coupled to said full wave rectifier and said output of said zero crossing detector to provide said analog version with said predetermined high amplitude.

5. A generator according to claim 4, wherein said second means includes a shock protection switch, trip break relay, a reversal relay, a shorting relay and a trouble relay coupled between said power switching amplifier and said telephone line, an ANI/coin filter, a ring trip filter, an alternating current filter, a balanced differential amplifier and a voltage sensor coupled to said power switching amplifier, an analog multiplexer coupled to said microcomputer, said ANI/coin filter, said ring trip filter, said alternating current filter, said differential amplifier and said voltage sensor, said multiplexer being controlled by said microcomputer to sequentially pass signals from said ANI/coin filter, said ring trip filter, said alternating current filter, said differential amplifier and said voltage sensor, and an analog to digital converter coupled to said multiplexer and said microcomputer to provide analog to digital conversion and to operate as a threshold detector for all signals passed through said multiplexer.

6. A generator according to claim 2, wherein said first means includes a digital to analog converter coupled to said microcomputer to convert said selected one of said low amplitude versions of said plurality of voltages to said analog version, a low pass filter coupled to said digital to analog converter to eliminate sampling frequencies from said analog version, a full wave rectifier coupled to said low pass filter to rectify negative portions of said analog version, a zero crossing detector having an input coupled to said low pass filter and an output coupled to said microcomputer, said zero crossing detector providing a logic one when the amplitude of said analog version is greater than zero volts, and a power switching amplifier coupled to said full wave rectifier and said output of said zero crossing detector to provide said analog version with said predetermined high amplitude.

7. A generator according to claim 6, wherein said second means includes a shock protection switch, trip break relay, a reversal relay, a shorting relay and a trouble relay coupled between said power switching amplifier and said telephone line, an ANI/coin filter, a ring trip filter, an alternating current filter, a balanced differential amplifier and a voltage sensor coupled to said power switching amplifier, an analog multiplexer coupled to said microcomputer, said ANI/coin filter, said ring trip filter, said alternating current filter, said differential amplifier and said voltage sensor, said multiplexer being controlled by said microcomputer to sequentially pass signals from said ANI/coin filter, said ring trip filter, said alternating current filter, said differential amplifier and said voltage sensor, and an analog to digital converter coupled to said multiplexer and said microcomputer to provide analog to digital conversion and to operate as a threshold detector for all signals passed through said multiplexer.

8. A generator according to claim 1, wherein said first means includes a digital to analog converter coupled to said computer means to convert said selected one of said low amplitude versions of said plurality of voltages to said analog version, a low pass filter coupled to said digital to analog converter to eliminate sampling frequencies from said analog version, a full wave rectifier coupled to said low pass filter to rectify negative portions of said analog version, a zero crossing detector having an input coupled to said low pass filter and an output coupled to said computer means, said zero crossing detector providing a logic one when the amplitude of said analog version is greater than zero volts, and a power switching amplifier coupled to said full wave rectifier and said output of said zero crossing detector to provide said analog version with said predetermined high amplitude.

9. A generator accordng to claim 8, wherein said second means includes a shock protection switch, trip break relay, a reversal relay, a shorting relay and a trouble relay coupled between said power switching amplifier and said telephone line, an ANI/coin filter, a ring trip filter, an alternating current filter, a balanced differential amplifier and a voltage sensor coupled to said power switching amplifier, an analog multiplexer coupled to said computer means, said ANI/coin filter, said ring trip filter, said alternating current filter, said differential amplifier and said voltage sensor, said multiplexer being controlled by said computer means to sequentially pass signals from said ANI/coin filter, said ring trip filter, said alternating current filter, said differential amplifier and said voltage sensor, and an analog to digital converter coupled to said multiplexer and said computer means to provide analog to digital conversion and to operate as a threshold detector for all signals passed through said multiplexer.

10. A generator according to claim 1, wherein said second means includes a shock protection switch, trip break relay, a reversal relay, a shorting relay and a trouble relay coupled between said power switching amplifier and said telephone line, an ANI/coin filter, a ring trip filter, an alternating current filter, a balanced differential amplifier and a voltage sensor coupled to said power switching amplifier, an analog multiplexer coupled to said computer means, said ANI/coin filter, said ring trip filter, said alternating current filter, said differential amplifier and said voltage sensor, said multiplexer being controlled by said computer means to sequentially pass signals from said ANI/coin filter, said ring trip filter, said alternating current filter, said differential amplifier and said voltage sensor, and an analog to digital converter coupled to said multiplexer and said computer means to provide analog to digital conversion and to operate as a threshold detector for all signals passed through said multiplexer.

11. A ring generator capable of supplying a plurality of predeterminedly selected distinct voltages each having a predetermined high amplitude and a predetermined frequency to a telephone line comprising:

a programmable computer means having low amplitude versions of said plurality of voltages stored therein in digital form, said computer means being responsive to predetermined control signals to select a desired one of said low amplitude versions of said plurality of voltages stored therein;

first means coupled to said computer means to convert said selected one of said low amplitude versions of said plurality of voltages to an analog version thereof and to increase said analog version to the predetermined high amplitude corresponding thereto prior to coupling to said telephone line; and
second means coupled to said first means, said telephone line and said computer means to monitor said selected one of said plurality of voltages coupled from said first means to said telephone line to detect the operating condition of said ring generator and said telephone line, wherein said first means includes
  a digital to analog converter coupled to said computer means to convert said selected one of said low amplitude versions of said plurality of voltages to said analog version,
  a low pass filter coupled to said digital to analog converter to eliminate sampling frequencies from said analog version,
  a full wave rectifier coupled to said low pass filter to rectify negative portions of said analog version,
  a zero crossing detector having an input coupled to said low pass filter and an output coupled to said computer means, said zero crossing detector providing a logic one when the amplitude of said analog version is greater than zero volts, and
  a power switching amplifier coupled to said full wave rectifier and said output of said zero crossing detector to provide said analog version with said predetermined high amplitude.

12. A generator according to claim 11, wherein said computer means includes a microcomputer.

13. A generator according to claim 12, wherein said second means includes
  a shock protection switch, trip break relay, a reversal relay, a shorting relay and a trouble relay coupled between said power switching amplifier and said telephone line,
  an ANI/coin filter, a ring trip filter, an alternating current filter, a balanced differential amplifier and a voltage sensor coupled to said power switching amplifier,
  an analog multiplexer coupled to said computer means, said ANI/coin filter, said ring trip filter, said alternating current filter, said differential amplifier and said voltage sensor, said multiplexer being controlled by said computer means to sequentially pass signals from said ANI/coin filter, said ring trip filter, said alternating current filter, said differential amplifier and said voltage sensor, and
  an analog to digital converter coupled to said multiplexer and said computer means to provide analog to digital conversion and to operate as a threshold detector for all signals passed through said multiplexer.

14. A generator according to claim 11, further including
  an interface means to couple said control signals from control equipment to said computer means and to couple status signals from said computer means to said control equipment.

15. A generator according to claim 11, wherein said second means includes
  a shock protection switch, trip break relay, a reversal relay, a shorting relay and a trouble relay coupled between said power switching amplifier and said telephone line,
  an ANI/coin filter, a ring trip filter, an alternating current filter, a balanced differential amplifier and a voltage sensor coupled to said power switching amplifier,
  an analog multiplexer coupled to said computer means, said ANI/coin filter, said ring trip filter, said alternating current filter, said differential amplifier and said voltage sensor, said multiplexer being controlled by said computer means to sequentially pass signals from said ANI/coin filter, said ring trip filter, said alternating current filter, said differential amplifier and said voltage sensor, and
  an analog to digital converter coupled to said multiplexer and said computer means to provide analog to digital conversion and to operate as a threshold detector for all signals passed through said multiplexer.

16. A ring generator capable of supplying a plurality of predeterminedly selected distinct voltages each having a predetermined high amplitude and a predetermined frequency to a telephone line comprising:
  a programmable computer means having low amplitude versions of said plurality of voltages stored therein in digital form, said computer means being responsive to predetermined control signals to select a desired one of said low amplitude versions of said plurality of voltages stored therein;
  first means coupled to said computer means to convert said selected one of said low amplitude versions of said plurality of voltages to an analog version thereof and to increase said analog version to the predetermined high amplitude corresponding thereto prior to coupling to said telephone line;
  second means coupled to said first means, said telephone line and said computer means to monitor said selected one of said plurality of voltages coupled from said first means to said telephone line to detect the operating condition of said ring generator and said telephone line, wherein
  said second means includes
    a shock protection switch, trip break relay, a reversal relay, a shorting relay and a trouble relay coupled between said power switching amplifier and said telephone line,
    an ANI/coin filter, a ring trip filter, an alternating current filter, a balanced differential amplifier and a voltage sensor coupled to said power switching amplifier,
    an analog multiplexer coupled to said computer means, said ANI/coin filter, said ring trip filter, said alternating current filter, said differential amplifier and said voltage sensor, said multiplexer being controlled by said computer means to sequentially pass signals from said ANI/coin filter, said ring trip filter, said alternating current filter, said differential amplifier and said voltage sensor, and
    an analog to digital converter coupled to said multiplexer and said computer means to provide analog to digital conversion and to operate as a threshold detector for all signals passed through said multiplexer.

17. A generator according to claim 16, wherein said computer means includes a microcomputer.

18. A generator according to claim 16, further including
  an interface means to couple said control signals from control equipment to said computer means and to couple status signals from said computer means to said control equipment.

* * * * *